US012565884B2

(12) United States Patent
Dougherty et al.

(10) Patent No.: US 12,565,884 B2
(45) Date of Patent: Mar. 3, 2026

(54) HYDRAULIC SYSTEM CONTROL

(71) Applicant: EATON INTELLIGENT POWER LIMITED, Dublin (IE)

(72) Inventors: Derek Paul Dougherty, Fruitport, MI (US); Jay Manoj Padgilwar, Nagpur (IN); Sauradeep Datta, Pune (IN); Aniket Devendra Sachdeva, Gujarat (IN)

(73) Assignee: Eaton Intelligent Power Limited, Dublin (IE)

( * ) Notice: Subject to any disclaimer, the term of this patent is extended or adjusted under 35 U.S.C. 154(b) by 532 days.

(21) Appl. No.: 18/154,350

(22) Filed: Jan. 13, 2023

(65) Prior Publication Data

US 2023/0250816 A1 Aug. 10, 2023

(30) Foreign Application Priority Data

Jan. 14, 2022 (IN) .............................. 202211002308

(51) Int. Cl.
*F04B 49/06* (2006.01)
*F04B 17/03* (2006.01)
*H02K 11/25* (2016.01)

(52) U.S. Cl.
CPC .............. *F04B 49/06* (2013.01); *F04B 17/03* (2013.01); *H02K 11/25* (2016.01)

(58) Field of Classification Search
CPC .. F04B 49/06; F04B 17/03; F04B 2203/0205; F04B 2203/0209; F04B 49/20; F04B 53/08; F04B 49/065; H02K 11/25
See application file for complete search history.

(56) References Cited

U.S. PATENT DOCUMENTS

| | | | | |
|---|---|---|---|---|
| 6,652,249 | B2 | 11/2003 | Kenney et al. | |
| 7,205,737 | B1 | 4/2007 | Bilodeau | |
| 2006/0054713 | A1* | 3/2006 | Wang | H05K 7/20209 |
| | | | | 236/49.3 |
| 2012/0274257 | A1* | 11/2012 | Taylor | H02P 29/67 |
| | | | | 318/473 |
| 2014/0018961 | A1* | 1/2014 | Guzelgunler | G05B 19/0423 |
| | | | | 700/275 |
| 2021/0006191 | A1 | 1/2021 | Bourse et al. | |

(Continued)

FOREIGN PATENT DOCUMENTS

| | | | | |
|---|---|---|---|---|
| CN | 208073664 | U | 11/2018 | |
| CN | 110978974 | A * | 4/2020 | H02K 9/06 |
| CN | 112311148 | A | 2/2021 | |

(Continued)

OTHER PUBLICATIONS

English translation of CN-110978974-A (Year: 2020).*

(Continued)

*Primary Examiner* — Tulsidas C Patel
*Assistant Examiner* — Joshua Kiel M Rodriguez
(74) *Attorney, Agent, or Firm* — Merchant & Gould P.C.

(57) ABSTRACT

A hydraulic system includes a hydraulic pump and a motor configured to drive the hydraulic pump. A sensor measures motor speed. A controller includes a model configured to determine system parameters based on the measured motor speed, and the controller is configured to output control signals to the motor and a fan based on the determined system parameters.

17 Claims, 9 Drawing Sheets

(56) References Cited

U.S. PATENT DOCUMENTS

2021/0184587 A1    6/2021   Oyama

FOREIGN PATENT DOCUMENTS

| CN | 112765786 A | * | 5/2021 | ............. G06F 30/20 |
|---|---|---|---|---|
| EP | 1255928 B1 | | 4/2006 | |
| EP | 3 483 445 A1 | | 5/2019 | |
| JP | 2019198206 A | * | 11/2019 | ............... H02P 9/48 |
| WO | 201807427 A1 | | 1/2018 | |
| WO | 2020/024836 A1 | | 2/2020 | |

OTHER PUBLICATIONS

English translation of JP-2019198206-A (Year: 2019).*
English translation of CN-112765786-A (Year: 2021).*
Extended European Search Report for Application No. 23151629.5 mailed Mar. 17, 2023.
"Application Note AP08078: Using CCU6E for BLDC control with synchronous rectification (active freewheeling)," Infineon: microcontrollors, V1.0, Aug. 2008.
Robert Istavan Lorincz et al. "Improved Power Distribution Method for BLDC Motor Driving Power Inverters," ISSCS2011— International Symposium on Signals, Circuits and Systems, Jun. 30, 2011.
"Freewheeling (Flyback) Diode," Electronics Coach, 2023, web access Apr. 13, 2023.

* cited by examiner

HYDRAULIC SYSTEM CONTROL

CROSS-REFERENCE TO RELATED APPLICATION

This application claims the benefit of Indian Provisional Patent Application No. 202211002308, filed on Jan. 14, 2022, the disclosure of which is incorporated herein by reference in its entirety.

BACKGROUND

Hydraulic systems include various hydraulic components such as pumps, motors, valves, actuators, hoses, etc. Hydraulic pumps are typically driven by a motor, such as an electric motor, which is controlled by a motor controller to achieve the desired pump operation. These hydraulic components can be prone to degradation and failures over time. Temperatures of various system components can affect system operation and reliability. Temperature control is thus desirable for such systems.

SUMMARY

In accordance with some aspects of the present disclosure, a hydraulic system includes a hydraulic pump with a motor configured to drive the hydraulic pump. A sensor is configured to determine a speed of the motor. A controller has a model configured to determine system parameters based on the determined speed of the motor, and controller outputs control signals to the motor and the fan based on the determined system parameters.

In accordance with further aspects of the disclosure, a thermal control system, such as for a hydraulic system, includes a sensor configured to measure a speed of a motor. In some examples, the motor drives a hydraulic pump. A motor controller receives the measured speed of the motor from the sensor, and outputs PWM control signals to the motor to selectively implement active freewheeling or passive freewheeling based on the measured speed of the motor. The controller further throttles a cooling fan based on the selected active freewheeling or the passive freewheeling.

In accordance with still further disclosed aspects, a control method includes receiving a signal indicating a speed of a motor by a controller. The speed of the motor to is compared a predetermined speed. Control signals are output by the controller to implement an active freewheeling control of the motor if the speed of the motor is greater than the predetermined limit speed. If the speed of the motor is not greater than the predetermined limit speed, passive freewheeling control of the motor is implemented by the controller. A cooling fan speed is determined by the controller based on whether the active freewheeling control or the passive freewheeling control is implemented.

DETAILED DESCRIPTION

Figure 1:
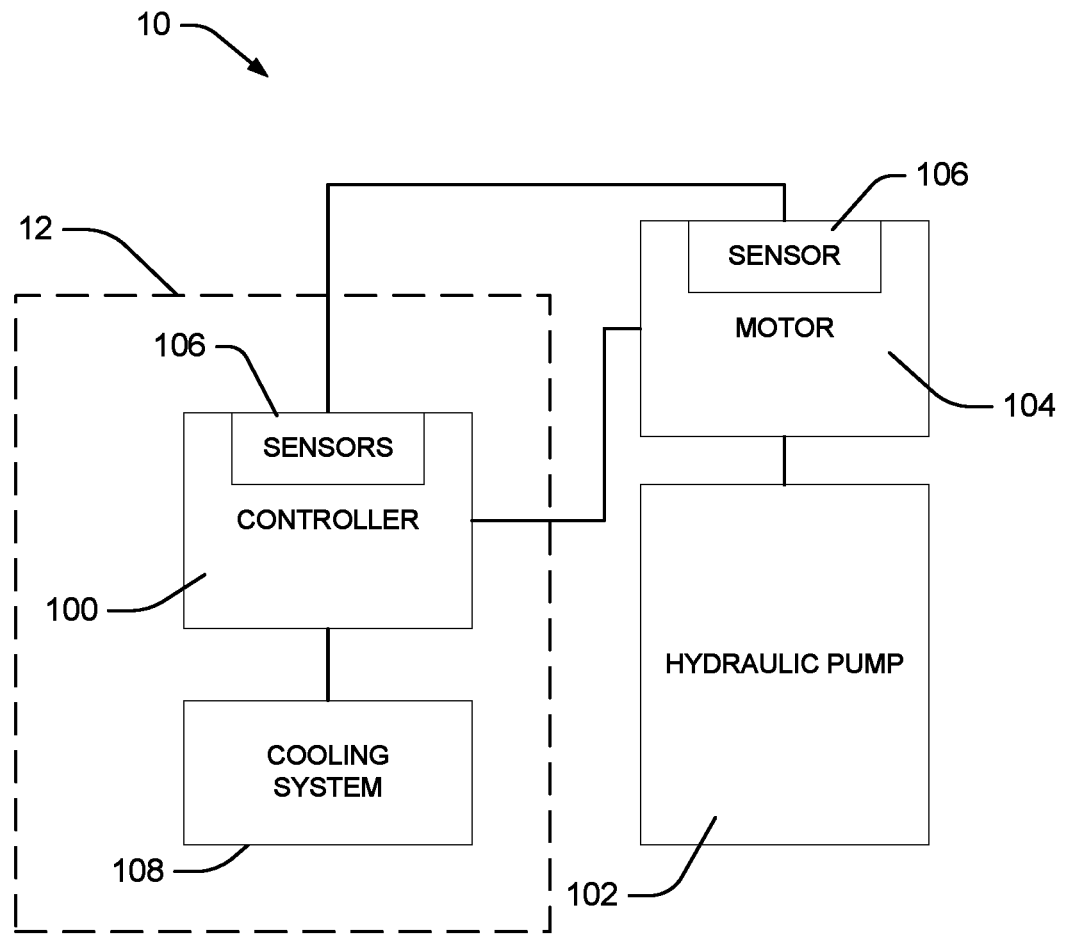
FIG. 1 is a block diagram conceptually illustrating an example of a hydraulic system in accordance with aspects of the present disclosure.

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

Some electric motor driven hydraulic systems use fixed displacement pumps. Such hydraulic systems may have constant pump input torque requirements over a wide range of pump input speeds. This constant torque can result in large freewheeling currents being present in the electric motor driving the pump when pulse width modulation (PWM) based control techniques are applied (e.g. field oriented control, space vector PWM, sinusoidal control, trapezoidal control upper and lower PWM, etc.).

Freewheeling occurs during the switching of current through an inductor, such as the windings of the motor driving the hydraulic pump. When current builds in the inductor, a corresponding magnetic field is produced. When current is interrupted or switched, the current in the inductor wants to keep flowing due to the magnetic field of the inductor. This current is known as the freewheeling current. If a path is not provided for the freewheeling current, large voltages can develop at the inductor, potentially causing system component damage.

To control the current and voltage applied to an electric motor, PWM techniques are often applied. The switches (transistors, IGBTs, MOSFETs, SiC, etc.) in the motor's "bridge" are PWM controlled between the "on" and "off" states to control the motor voltage and current. During the "on" cycle of the PWM signal, voltage is applied and current develops in the motor windings. During the "off" cycle of the PWM signal, the current in the motor winding tends to keep flowing due to the inductance of the motor windings. If a path is not provided for the freewheeling current, large voltages can develop at the inductor (motor winding), possibly causing system component damage (e.g. switch damage).

In some motor control systems, passive freewheeling diodes (FWD) are used in the motor controller to provide a path for the freewheeling currents. Freewheeling diodes allow for a passive technique based on the diodes' forward bias path to route the motor currents.

The current present in the motor driving the hydraulic pump is constant based on the constant torque requirements of the pump. Thus, at low speeds, the PWM on the time duty cycle is low. Therefore, the system will be in the freewheeling operation longer. These large currents flow through the FWD during this time, possibly causing significant thermal losses, which in turn can lowers system efficiency.

Such thermal losses resulting from the higher freewheeling currents may lead to higher power (heat) losses, which in turn impose higher cooling requirements and thus higher fan speeds. Constantly operating the cooling fan at high speed could lead to a reduced overall system reliability. The fan reliability (impacted by fan speed) has a significant contribution to the overall system reliability. In other words, high power losses (i.e. increased heat) may require the cooling fan to generally run at high speeds, reducing system reliability.

In accordance with aspects of the present disclosure, motor control systems are employed in which freewheeling currents may be actively controlled. By actively controlling the freewheeling currents and routing them through the motor controller switches in a strategic pattern complimentary to the normal switching operation, the system losses can be reduced and thermal heat rejection better managed. This is due to the higher efficiency of the switches as compared to freewheeling diodes. Also, the thermal impedance is typically better for switch modules and packages. In addition, the system reliability is improved due to reduced power losses, and thermal performance is optimized by using intelligent switching between passive and active freewheeling. Accordingly, the system's cooling fan speed can be controlled to optimize the air flow rate requirement. The optimized fan operation provides further improvements in system reliability.

Thus, techniques for intelligent hydraulic system thermal management are disclosed. One or more parameters, such as motor speed and/or current are determined by a sensor and monitored, and based thereon other system parameters are estimated (e.g. power losses, electronics device temperatures, housing internal temperature, etc.). Measured and estimated parameters are used for active control of the system cooling (i.e. fan speed control), motor current/voltage switching and selecting freewheeling methods. This provides an increased system efficiency, lower system heat rejection and improved system reliability.

Disclosed examples use active freewheeling control techniques along with thermal management (e.g. fan speed control) systems and system computational resources to minimize system losses and maximize efficiency and reliability. For instance, the system controller may monitor motor speed, bay temperatures, and altitude to predict other system temperatures (e.g. electronic junction temperatures and housing internal air temperature) using a system thermal model accessible to the controller. The measured and predicted parameters are then used to determine the type of freewheeling method and the fan speed to meet desired thermal requirements while improving overall system reliability and efficiency.

Active freewheeling methods may have diminishing returns as speed increases. This is due to the off time of the PWM duty cycle or modulation index reducing as the motor speed is increased by applying more voltage. The motor voltage is a function of the PWM on time duty cycle. Thus, in some examples the controller selects between active and passive freewheeling based on the measured and estimated system parameters.

FIG. 1 is a block diagram illustrating aspects of a hydraulic system 10 in accordance with the present disclosure. The hydraulic system 10 includes a system control circuit or controller 100 and a hydraulic pump 102 that is driven by an electric motor 104. In some examples, the hydraulic pump 102 is a fixed displacement pump. The controller 100 may be implemented by any suitable processing device or circuit such as a microprocessor, a digital signal processor, an application-specific integrated circuit, a field programmable gate array, etc. and includes components such as a CPU and memory (RAM, ROM, etc.). A cooling system 108 is provided for environmental control of the system, and particularly for cooling the motor 104. In some implementations, the cooling system 108 may further be configured to cool hydraulic pump 102, or an additional cooling system may be provided for this purpose. One or more sensors 106 are configured to measure system parameters. One or more of the components of the system 10 may be situated in a housing 12.

In the illustrated example, the cooling system 108 is configured to cool the controller 100. The coolant flow of the controller 100 may be provided, for example, through liquid cooling via a pump or via air cooling using forced convection with a fan. While a cooling system 108 employing a fan is disclosed and discussed in some embodiments, the cooling system is not limited to air cooling via a fan.

In some embodiments only a minimal number of the sensors 106 are employed, simplifying control and operation of the system 10. For example, some implementations provide only a sensor 106 configured to measure motor speed. Other examples further include a sensor 106 for measuring temperatures, such as the internal air temperature of the housing 12. Rather than measure other system parameters used for system control, such parameters are estimated or derived by the controller 100 based on the motor speed determined by the sensor 106 to provide "sensorless" monitoring of such other parameters. As noted above, further examples may include a sensor 106 for measuring temperature, such as ambient temperature inside the housing 12. Some embodiments thus employ an "intelligent" control system in which the controller 100 uses physics-based models for determining or predicting estimated parameters such as electronics power losses and junction temperatures, and housing internal temperature. The physics-based models may include, for example, mathematical models that calculate the estimated parameters based in inputs such as parameter(s) measured by the sensor(s) 106.

Moreover, as noted above, the controller 100 is configured to switch between normal (i.e. passive) and active freewheeling modes based on operating conditions to optimize thermal performance. In general, as used herein passive freewheeling refers to PWM motor control schemes in which passive freewheeling diodes are employed in a motor controller to provide a path for the freewheeling currents based on the freewheeling diodes' forward bias path. In contrast, active freewheeling as used herein refers to PWM motor control schemes in which motor controller switches (i.e. inverter switches) are controlled in a pattern complimentary to the normal switching operation to provide a path for the motor winding freewheeling currents via the controlled inverter switches.

Figure 2A:
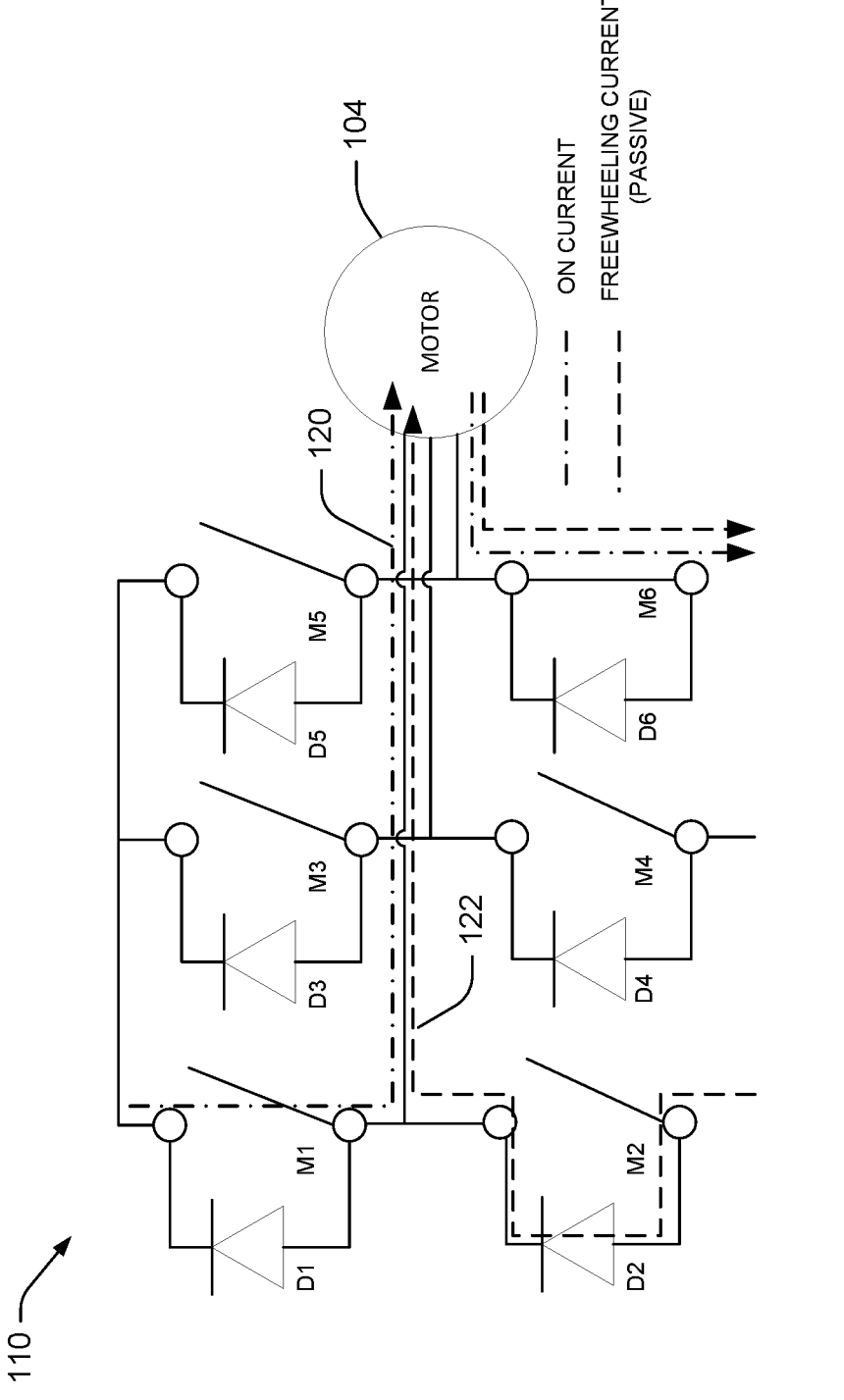
FIG. 2A illustrates an example of passive freewheeling in a motor drive circuit.
Figure 2B:
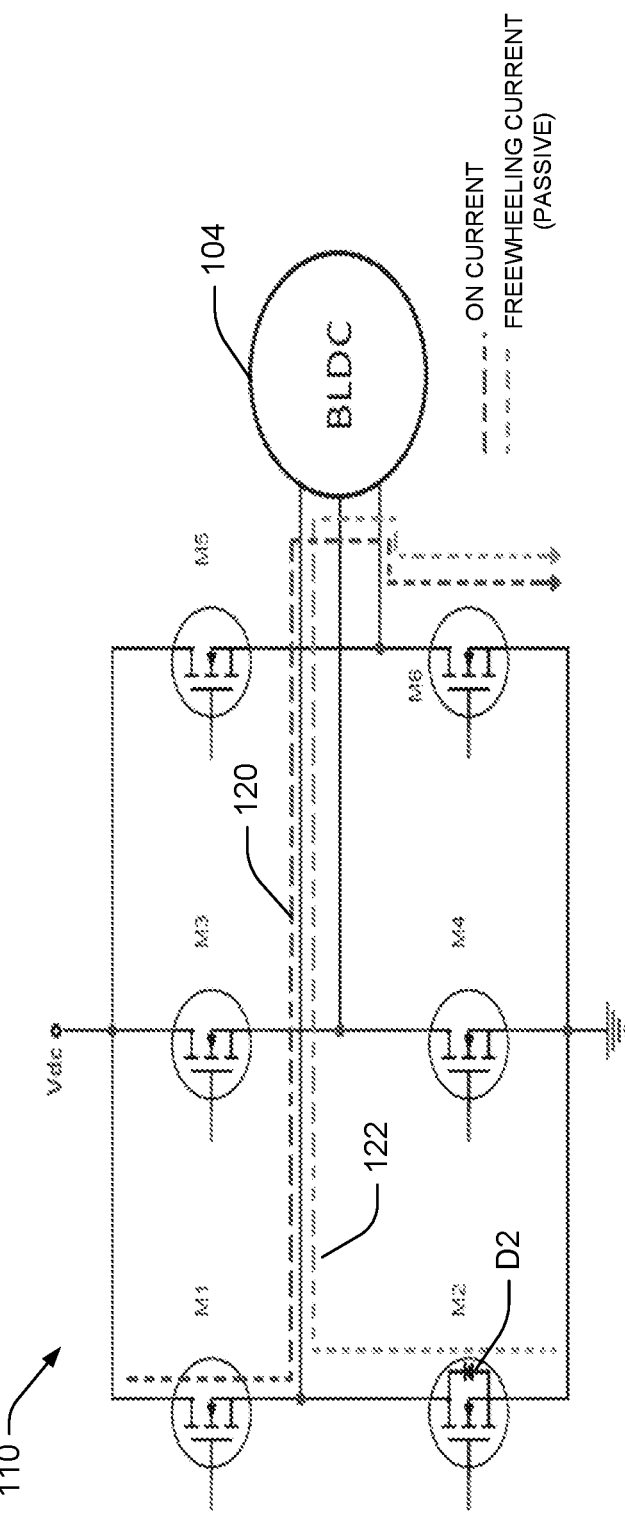
FIG. 2B illustrates another example of passive freewheeling in a motor drive circuit.
Figure 3A:
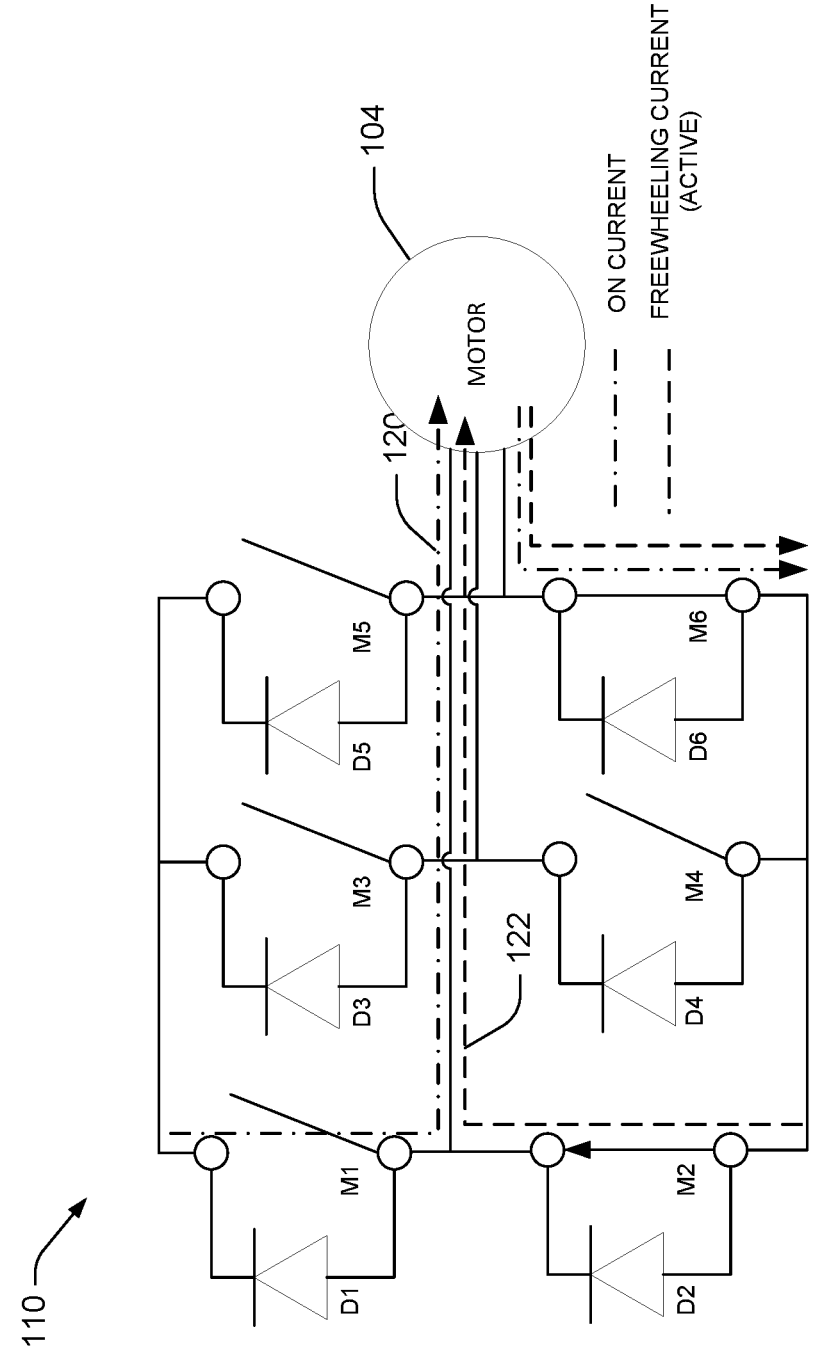
FIG. 3A illustrates an example of active freewheeling in a motor drive circuit.
Figure 3B:
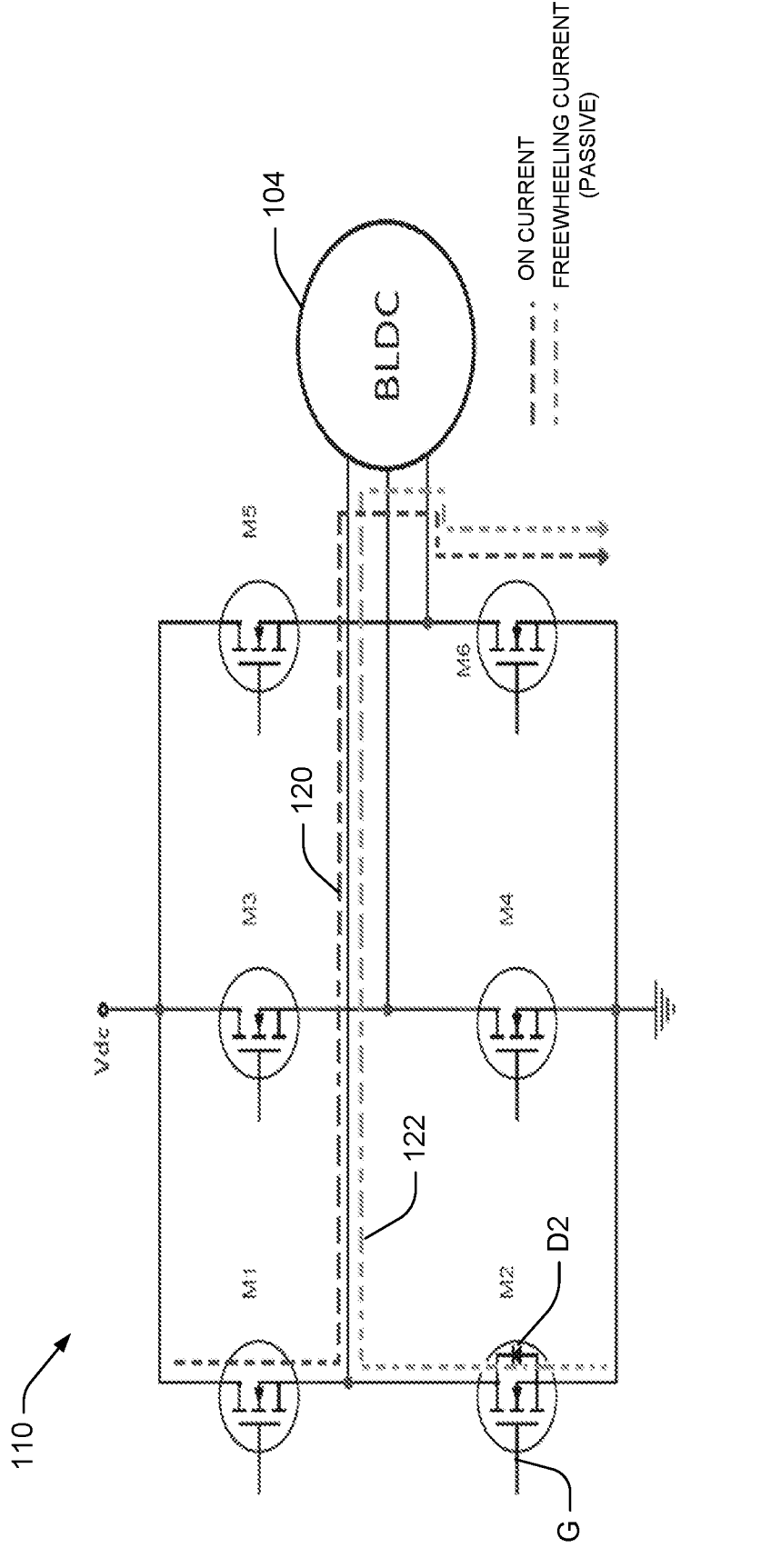
FIG. 3B illustrates an example of active freewheeling in a motor drive circuit.

FIGS. 2A, 2B, 3A and 3B illustrate aspects of embodiments of a motor drive circuit 110, which is controlled by the controller 100. In some examples, the motor drive circuit 110 is integrated with, or is a component of the controller 100. The motor drive circuit 110 includes a three-phase inverter that receives a DC voltage signal. The inverter includes switches, such as transistors (i.e. MOSFETs) M1-M6 configured in half-bridges connected in parallel. FIGS. 2B and 3B illustrate an embodiment in which the switches are MOSFETs M1-M6. The controller 100 selectively outputs PWM control signals to gate terminals of the transistors M1-M6 to supply three-phase voltages to the respective motor windings. In the example illustrated in FIGS. 2B and 3B, the motor 104 is a brushless DC motor (BLDC), though other suitable motors may be employed in alternative embodiments.

FIGS. 2A and 2B illustrate a passive freewheeling arrangement, where the switch or transistor M1 is controlled to provide a first phase drive current 120 to the first phase winding of the motor 104. FIGS. 2A and 2B further illustrate freewheeling current 122 that occurs during the off portion of the PWM signal. A freewheeling diode is basically a diode connected across the inductive load (i.e. respective motor phase winding) to prevent the development of high voltage across the associated switch. FIGS. 2A and 3A illustrate diodes D1-D6 connected in parallel with respective switches M1-M6. In the example of FIGS. 2B and 3B, a body diode or intrinsic body diode D2 of the transistor M2 functions as the freewheeling diode (only diode D2 is labeled in FIGS. 2B and 3B for ease of illustration). When the switch or transistor M1 is in an on state, the external potential reverse biases the freewheeling diode D2. When the switch or transistor M1 is off, the freewheeling current 122 flows through the freewheeling diode D2.

FIGS. 3A and 3B illustrate an active freewheeling arrangement. Instead of using diodes, such as the diodes D1-D6 for providing a freewheeling current path for the motor current as shown in FIGS. 2A and 2B, active freewheeling uses the switch conduction for freewheeling the motor current. The controller 100 applies control signals to the appropriate switches or transistors M1-M6 to provide the desired freewheeling current path. For instance, In FIG. 3B the transistor M2 is controlled by control signals applied to its gate terminal G by the controller 100. The applied control signals selectively bias the transistor M2 so as to allow the freewheeling current 122 to flow through the transistor M2, rather than through the diode D2 as shown in FIGS. 2A and 2B.

As noted above, some hydraulic systems have constant pump input torque requirements over a wide range of pump input speeds. Such applications with relatively high and/or constant torque over a wide dynamic motor speed range can have large freewheeling currents. The voltage drop across the motor control transistors, such as the transistor M2, resulting from the freewheeling current 122 is substantially lower than the voltage drop across the intrinsic body diode D2. For instance, in some implementations the voltage drop across the body diode D2 resulting from the freewheeling current is about 1 v as compared to a voltage drop of 0.1 v across the transistor M2 (in an on state).

Figure 4:
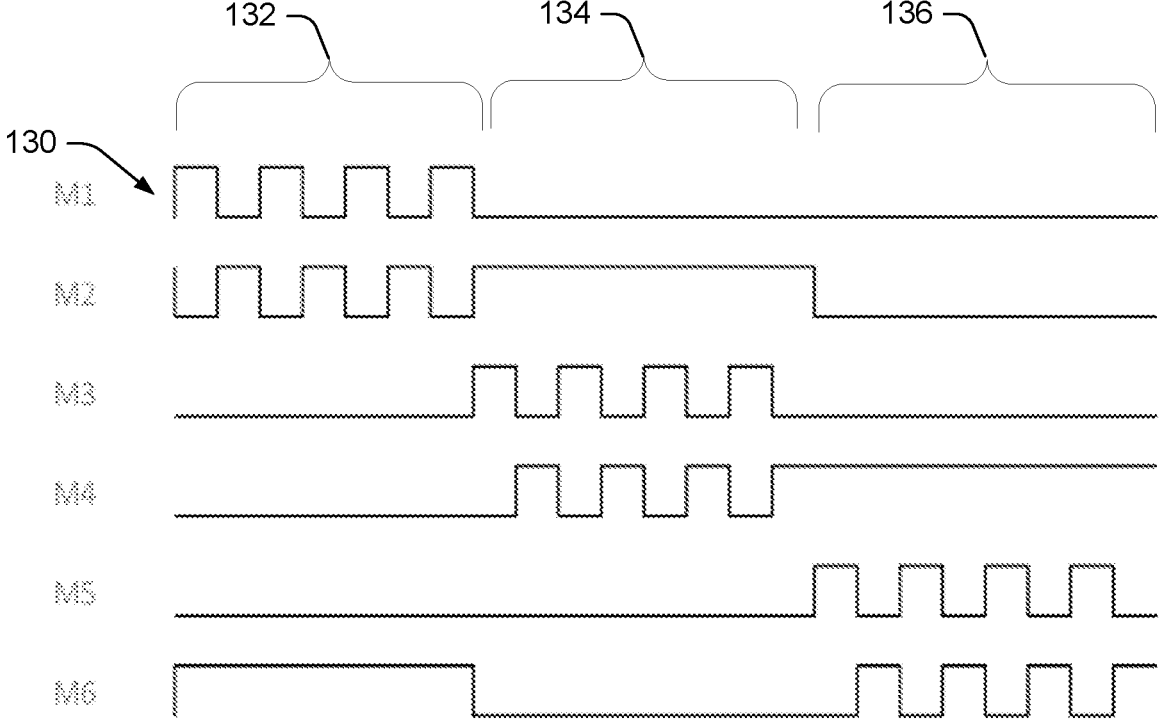
FIG. 4 illustrates portions of PWM signals for implementing active freewheeling in a motor drive circuit.

FIG. 4 illustrates example PWM control signal waveforms for controlling the transistors M1-M6 for each phase of the motor drive circuit 110. For each phase, immediately following its on period, the associated bottom transistor (i.e. M2, M4, M6) is turned on to provide a freewheeling path. For example, referring to FIG. 3A or 3B in conjunction with FIG. 4, during the on period 132 of the first phase (i.e. transistors M1, M2) the PWM control signals 130 are applied to the gate terminals of transistors M1 and M2 to provide the desired current path for the drive current 120 driving the first phase winding of the motor 104. During an off period 134 of the first phase immediately following the on portion 132, the bottom transistor M2 receives the control signal 130 at its gate terminal from the controller 100 to bias the transistor M2 on and provide a path for the freewheel current 122 from the first phase winding of the motor 104. When the freewheel current 122 in the first phase winding has dissipated, the transistor M2 is biased off by the control signal 130 during the last portion 136 of the first phase control signal 130.

While the examples shown in FIGS. 2B and 3B employ MOSFETS for the control transistors M1-M6 of the motor drive circuit 110, this disclosure is not limited to MOSFETs. Disclosed principles can be extended to similar motor driving bridges using, for example, bipolar transistors, thyristors, IGBTs or other active switch types.

In certain situations, active freewheeling is sometimes avoided because it can be difficult to implement. Synchronous switching operations for the transistors M1-M6 may employed to reduce chances of short-circuiting. Further, a dead time may be included between the turn on and off operations of the transistors. In some disclosed examples the controller 100 is configured to selectively switch between active and passive freewheeling operations depending on measured and derived system parameters.

Moreover, the cooling system 108 is provided for temperature control of the system 10, and particularly the controller 100 as noted above. The reliability of various components in the disclosed system 10 is related to duty cycle usage and coolant flow rates in some examples. Thus, cooling fan or pump speed throttling based on system parameters and motor operation can reduce power consumption and facilitate overall system reliability improvement, while still meeting temperature requirements of the system. In other words, the speed of the cooling system 108 fan or pump can be reduced in some situations where less heat is generated by the system components as determined by the measured and estimated system parameters. Reducing the fan or pump of the cooling system 108 saves power and in turn, increases the life of the fan or pump. For example, as noted above, active freewheeling control modes produce less heat than passive freewheeling, so less cooling may be necessary. Accordingly, some disclosed embodiments provide thermal control for the system 10 based on measured and derived system parameters, as well as motor operation (e.g. active vs. passive freewheeling).

Figure 5:
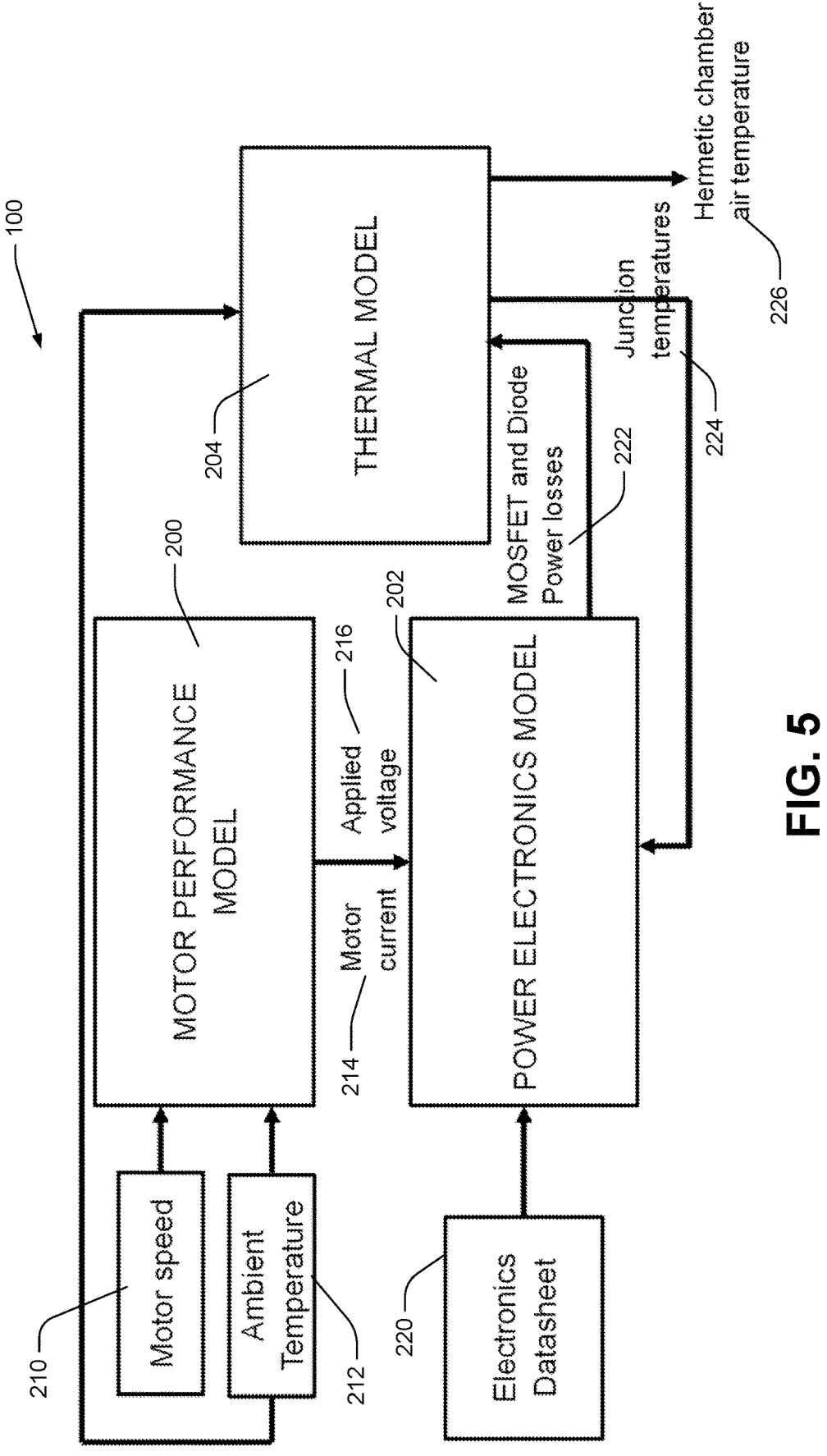
FIG. 5 is a block diagram illustrating aspects of an example of a system controller.

FIG. 5 is a block diagram illustrating further aspects of an example of the controller 100. In the example of FIG. 5, the controller 100 is configured (i.e. programmed) to implement active cooling and freewheeling controls by varying the fan speed and switching between freewheeling methods to satisfy temperature requirements while maximizing system reliability. The controller 100 includes physics-based models configured to predict parameters such as power losses, electronics junction and housing internal air temperatures, and the like for a given motor and hydraulic system duty cycle based on system parameter measurements. In the example of FIG. 5, the physics-based models include a motor performance model 200, a power electronics model 202, and a thermal model 204. The motor performance model 200, the power electronics model 202 and the thermal model 204 for example, may include mathematical models that are flashed into the software code of the controller 100 or otherwise stored in memory accessible by the controller 100. Parameters measured by the sensor(s) 106 may be inputs to the mathematical models to calculate the various system parameters. In other embodiments, various look up tables are built based on such models, where the estimated parameters are retrieved from the look up tables based on the received inputs.

In some examples, only motor speed and ambient temperature are measured by the sensor 106 shown in FIG. 1. Accordingly, "sensorless" monitoring of other critical system operating parameters is provided by measuring only limited system parameters to make system control decisions. As shown in FIG. 5, the motor speed 210 measured by the sensor 106 associated with the motor 104 along with ambient temperature 212 are received as inputs by the motor performance model 200. The ambient temperature 212 is also received by the thermal model 204. The motor speed 210 and ambient temperature 212 are applied to the motor performance model 200, which is configured to predict motor current 214 and applied voltage 216, which are input to the power electronics model 202.

In addition to the motor current 214 and applied voltage 216 determined by the motor performance model 200, the power electronics model 202 receives data concerning the various components employed in the motor drive circuit 110 from an electronics datasheet 220. Based on these inputs along with an estimate of junction temperatures provided by the thermal model 204, the power electronics model 202 estimates power losses 222 of the switches (i.e. MOSFETs) M1-M6 and diodes D1-D6.

The thermal model 204 receives as inputs the ambient temperature 212, along with MOSFET and diode power losses 222 and based thereon, determines junction temperatures 224 of components such as the MOSFETs and/or diodes. The thermal model 204 further estimates the hermetic chamber air temperature 226 based on the received inputs.

Thus, the controller 100 is configured to receive the measured motor speed 210 and ambient temperature 212 as inputs and determine system performance parameters such as motor current 214, power losses for both active and passive freewheel modes, junction temperatures (e.g. diode and MOSFET junction temperatures), hermetic chamber air temperature, etc. Based on these factors, some implementations of the controller 100 are further configured to estimate electronics reliability (MTBF) and fan reliability (MTBF).

The controller 100 then uses the measured motor speed 210 and the predicted (calculated) parameters to take decisions regarding the freewheeling type selection and fan speed variation. The use of the physics-based models (e.g. motor performance model 200, power electronics model 202, and thermal model 204) reduces the number of sensors required, such as thermocouples, thermistors, current sensors, etc.

Figure 6:
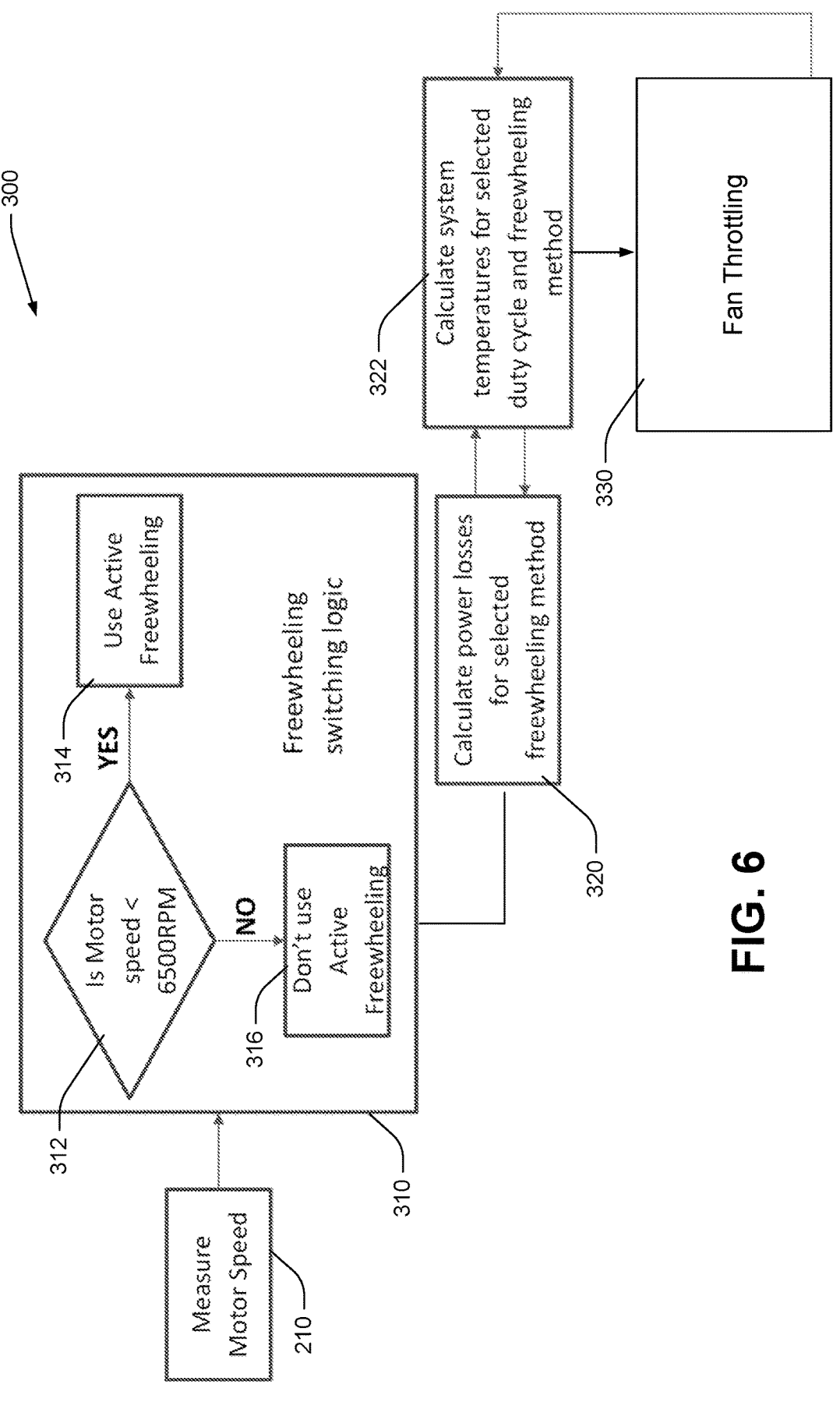
FIG. 6 is a block diagram illustrating an example of a thermal management process implemented by the controller shown in FIG. 5.

FIG. 6 is a block diagram illustrating an example of a thermal management process 300 implemented by the controller 100. As noted above, the controller 100 receives the measured motor speed 210 from the sensor 106. Based on the motor speed 210, a freewheeling switching logic process 310 determines whether active freewheeling or passive freewheeling is employed for motor control. In the illustrated example, the freewheeling switching logic 310 determines if the measured motor speed 210 is less than some predetermined motor speed in decision block 312. In the illustrated example, the decision block 312 compares the measured motor speed 210 to a predetermined motor speed of 6500 RPM. If the motor speed 210 is less than the predetermined speed, active freewheeling is employed as shown in block 314. If the motor speed 210 is not less than the predetermined speed, then active freewheeling is not used as indicated in block 316.

Based on the type of freewheeling employed as determined by the freewheeling switching logic 310, power losses are estimated in block 320. In block 322, system temperatures are determined based on the freewheeling mode used during a particular motor duty cycle. The output of block 322 is further fed back to block 320. Based on the system temperatures calculated in block 322, fan speed is determined in a fan throttling block 330. The fan speed determined in block 330 is used for operation of the fan of the cooling system 108, and is also fed back to block 322.

Figure 7:
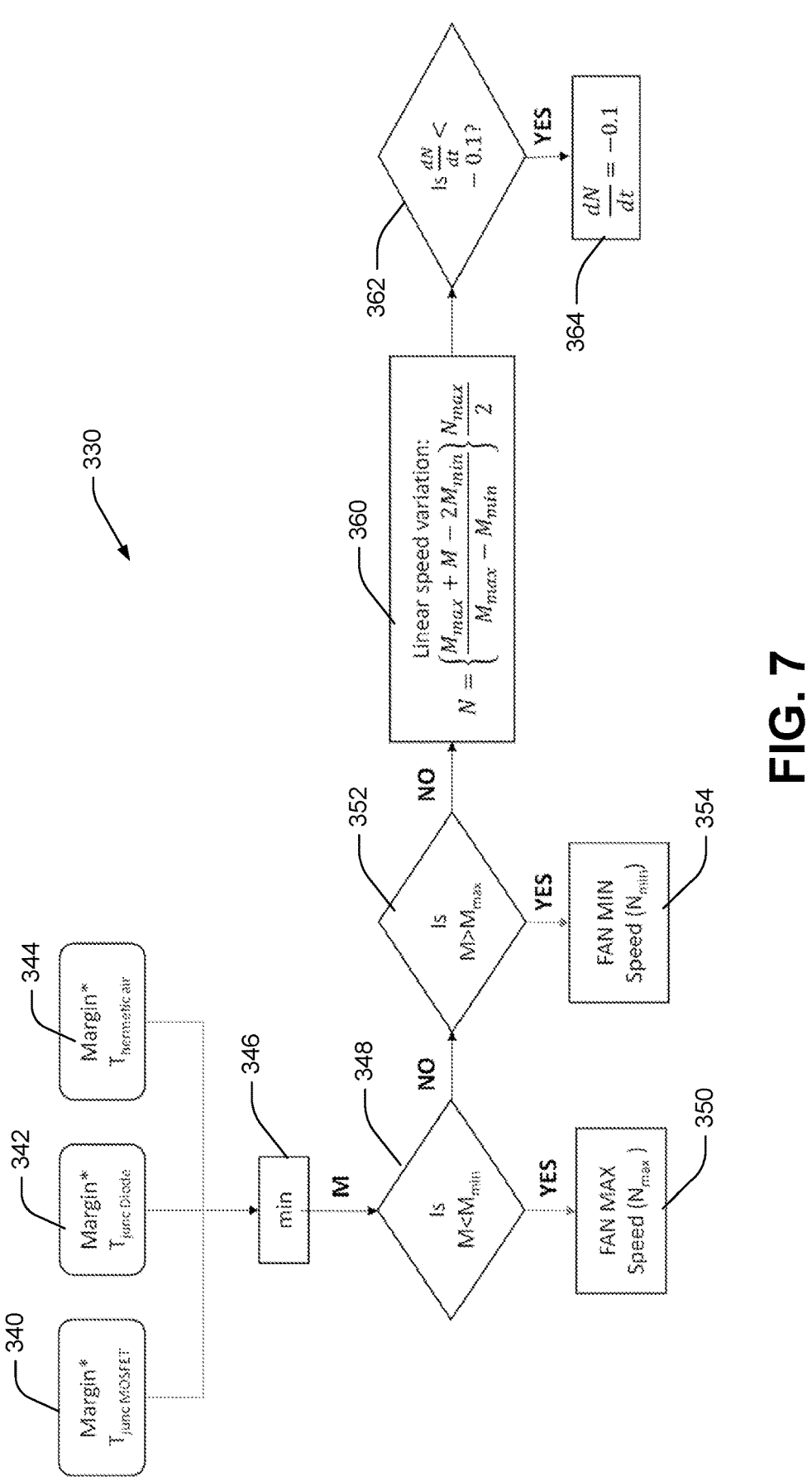
FIG. 7 is a block diagram illustrating an example of a fan throttling process of the thermal management process illustrated in FIG. 6.

FIG. 7 illustrates an example of the fan throttling logic 330. In the illustrated embodiments, there are different temperature requirements for different system components (i.e. electronic components) and for other portions of the system 10, such as air temperature inside the chamber that houses the electronic components.

The temperatures of predetermined parts of the system are determined and compared with predetermined limits. For example, junction temperatures 224 for the MOSFETs and diodes, and the hermetic chamber air temperature 226 determined by the thermal model 204 are compared to maximum allowable limits for these parameters to determine a MOSFET junction temperature margin 340, a diode junction temperature margin 342 and a hermetic temperature margin 344.

The minimum of the MOSFET junction temperature margin 340, the diode junction temperature margin 342 and the hermetic temperature margin 344 is determined at block 346. This minimum margin M is compared to a predetermined minimum value $M_{min}$ in decision block 348. If the minimum margin M is less than the predetermined minimum margin $M_{min}$ (i.e. the temperature is close to its predetermined maximum temperature), the associated temperature is too close to its maximum allowable limit so the fan 108 is operated at a high or maximum speed $N_{max}$ (providing greater cooling) as indicated in block 350.

If the margin M is between predetermined $M_{min}$ and $M_{max}$ values, the fan speed is varied as determined in block 360. In the illustrated example, the fan speed is varied linearly in block 360. The output of the linear speed variation calculation 360 is compared to a desired rate of change in decision block 362 to determine the rate of change of the fan speed. A limit is applied to the rate of fan speed reduction as determined in block 364 to prevent an oscillatory response.

If the margin M is between predetermined $M_{min}$ and $M_{max}$ values, the fan speed is varied as determined in block 360. In the illustrated example, the fan speed is varied linearly in block 360. The output of the linear speed variation calculation 360 is compared to a desired rate of change in decision block 360 to determine the rate of change of the fan speed. A limit is applied to the rate of fan speed reduction as determined in decision block 362 to prevent an oscillatory response.

As shown in FIG. 6, the fan speed determined using fan throttling logic 330 is applied as an input to the thermal calculation block 322, which determines the various system temperatures, which in turn dictate the fan speed needed based on margins available.

The foregoing outlines features of example embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A hydraulic system, comprising:
a hydraulic pump,
a motor configured to drive the hydraulic pump;
a sensor configured to determine a speed of the motor;
a cooling system including a fan; and
a controller including a model configured to determine hydraulic system parameters based on the determined speed of the motor, wherein the controller is configured to output control signals to the motor and the cooling system based on the determined hydraulic system parameters, wherein the controller is configured to select a passive freewheeling mode or an active freewheeling mode based on the determined speed of the motor, and wherein the controller is configured to vary a speed of the fan based on whether the active freewheeling mode or the passive freewheeling is selected.

2. The hydraulic system of claim 1, wherein the motor is a brushless DC motor (BLDC).

3. The hydraulic system of claim 1, wherein the cooling system includes a forced convection system including the fan configured to cool the controller.

4. The hydraulic system of claim 1, wherein the cooling system includes a liquid cooling system including a pump configured to circulate cooling fluid to cool the controller.

5. The hydraulic system of claim 1, wherein the model is stored in a memory accessible by the controller.

6. The hydraulic system of claim 1, further comprising a motor control circuit including an inverter circuit having a plurality of transistors arranged in a bridge configuration, wherein an intrinsic body diode of at least one of the transistors provides a freewheeling current path during the passive freewheeling mode, and wherein the controller is configured to output the PWM signals to at least one of the transistors such that the at least one transistor provides the freewheeling current path during the active freewheeling mode.

7. The hydraulic system of claim 6, wherein the transistors are MOSFETs.

8. The hydraulic system of claim 7, wherein the model includes a motor performance model configured to estimate a motor current and an applied motor voltage based on the determined speed of the motor and an ambient temperature measurement.

9. The hydraulic system of claim 8, wherein the model includes a power electronics model configured to estimate power losses of the MOSFETs based on the motor current and applied motor voltage estimated by the motor performance model and a datasheet.

10. The hydraulic system of claim 9, wherein the model includes a thermal model configured to estimate junction temperatures of the MOSFETs estimated power losses of the MOSFETs an hermetic chamber temperature based on the power losses of the MOSFETs estimated by the power electronics model and the ambient temperature measurement.

11. The hydraulic system of claim 10, wherein the model includes a thermal management process configured to vary a rate of change of a speed of the fan.

12. A thermal control system, comprising:
a sensor configured to measure a speed of a motor;
a motor controller configured to:
receive the measured speed of the motor;
output PWM control signals to the motor to selectively implement active freewheeling or passive freewheeling based on the measured speed of the motor; and
control a fan of a cooling system based on the selected active freewheeling or the passive freewheeling.

13. The system of claim 12, further comprising a motor control circuit including an inverter circuit having a plurality of transistors arranged in a bridge configuration, wherein an intrinsic body diode of at least one of the transistors provides a freewheeling current path for the passive freewheeling, and wherein the motor controller is configured to output the PWM signals to at least one of the transistors such that the at least one transistor provides the freewheeling current path for the active freewheeling.

14. The system of claim 12, wherein the motor controller includes a model configured to determine system parameters based on the determined speed of the motor.

15. A method, comprising:
receiving a signal indicating a speed of a motor by a controller;
comparing the speed of the motor to a predetermined speed;
outputting control signals by the controller to implement an active freewheeling control of the motor if the speed of the motor is greater than the predetermined limit-speed;
implementing a passive freewheeling control of the motor if the speed of the motor is not greater than the predetermined limit speed; and
varying a cooling fan speed by the controller based on the implemented active freewheeling control or the implemented passive freewheeling control.

16. The method of claim 15, wherein outputting the control signals by the controller includes outputting the control signals to transistors of a motor control circuit, and wherein the method further comprises:
calculating power losses of the motor control circuit by the controller based on the motor speed and the passive freewheeling control of the motor;
calculating temperatures of the motor control circuit by the controller based on the calculated power losses; and
throttling the cooling fan speed based on the calculated temperatures.

17. The method of claim 16, further comprising:
determining a difference between the calculated temperatures and a predetermined maximum temperature by the controller; and
calculating a rate of change for throttling the cooling fan speed based on the determined difference.

* * * * *